United States Patent
Iida

[11] Patent Number: 6,098,521
[45] Date of Patent: Aug. 8, 2000

[54] RODLESS CYLINDER

[75] Inventor: Kazuhiro Iida, Toride, Japan

[73] Assignee: SMC Kabushiki Kaisha, Tokyo, Japan

[21] Appl. No.: 09/146,423

[22] Filed: Sep. 3, 1998

[30] Foreign Application Priority Data

Sep. 24, 1997 [JP] Japan ................................. 9-258768

[51] Int. Cl.⁷ ................................................ F01B 29/00
[52] U.S. Cl. ................................................ 92/88; 92/129
[58] Field of Search ............................ 92/85 R, 88, 129, 92/143

[56] References Cited

U.S. PATENT DOCUMENTS

| | | | |
|---|---|---|---|
| D. 365,352 | 12/1995 | Miyamoto et al. . | |
| 3,893,378 | 7/1975 | Hewitt | 92/88 |
| 4,519,297 | 5/1985 | Lipinski | 92/88 |
| 4,664,019 | 5/1987 | Lipinski et al. | 92/88 |
| 4,785,716 | 11/1988 | Vaughn et al. | 92/88 X |
| 4,813,341 | 3/1989 | Vaughn | 92/88 |
| 5,279,207 | 1/1994 | Takada et al. | 92/88 X |
| 5,317,957 | 6/1994 | Miyamoto | 92/88 |
| 5,330,272 | 7/1994 | Stoll | 92/88 X |
| 5,469,775 | 11/1995 | Stoll et al. | 92/88 |
| 5,483,868 | 1/1996 | Green | 92/88 |
| 5,507,218 | 4/1996 | Lipinski | 92/88 |
| 5,537,912 | 7/1996 | Miyamoto et al. | 92/88 |
| 5,555,789 | 9/1996 | Rosengren et al. | 92/88 X |
| 5,606,903 | 3/1997 | Drittel | 92/88 |
| 5,619,899 | 4/1997 | Asai et al. . | |

FOREIGN PATENT DOCUMENTS

| | | |
|---|---|---|
| 60-234106 | 11/1985 | Japan . |
| 7-1041 | 1/1995 | Japan . |

*Primary Examiner*—John E. Ryznic
*Attorney, Agent, or Firm*—Oblon, Spivak, McClelland, Maier & Neustadt, P.C.

[57] ABSTRACT

An end cover and a coupler, which construct a load-absorbing mechanism, make sliding displacement in a state of relative surface-to-surface contact respectively. Thus, the load, which is exerted in the horizontal and vertical directions, in the rotational direction about the axis, in the rotational direction about the perpendicular to the axis, and in various directions given by combining these directions in a complex manner, is absorbed.

12 Claims, 12 Drawing Sheets

RODLESS CYLINDER

BACKGROUND OF THE INVENTION

1. Field of the Invention

The present invention relates to a rodless cylinder which functions, for example, as a transport means for a workpiece.

2. Description of the Related Art

In recent years, various rodless cylinders have adopted as means for transporting workpieces in factories and the like. Those known as the conventional rodless cylinder include a mechanism in which a bearing is provided between a guiding component and a load-transmitting component. The guiding component and the load-transmitting component are formed to be mutually rotatable about the bearing axis, and they are provided to be mutually movable by predetermined amounts in the axial direction of the bearing. Thus, the load, which is exerted on the guiding component or the load-transmitting component, is absorbed (see Japanese Laid-Open Patent Publication No. 60-234106).

Those known as the conventional rodless cylinder include another mechanism in which an engaging recess is formed on a lower surface of a slider. An engaging projection for making engagement with the engaging recess is provided on an upper surface of a yoke which is formed integrally with a piston. The load in the horizontal and vertical directions is absorbed by the aid of a gap formed between the engaging projection and the engaging recess. Planar torsion is absorbed by the aid of an arc surface formed on the engaging projection (see Japanese Patent Publication No. 7-1041).

However, the technical concept disclosed in Japanese Laid-Open Patent Publication No. 60-234106 involves the following inconvenience. That is, it is impossible to absorb the load exerted in the direction approximately parallel to the axis of a cylindrical member which functions as a cylinder body and in the direction perpendicular to the axis. Further, it is impossible to absorb the load exerted in the rotational direction about the axis of the cylindrical member.

On the other hand, the technical concept disclosed in Japanese Patent Publication No. 7-1041 involves the following inconvenience, because the arc surface formed on the engaging projection and the plane of an abutment component are provided so that they make line-to-line contact. That is, the arc surface is deformed by the load exerted on the engaging projection, resulting in deterioration of durability.

SUMMARY OF THE INVENTION

A general object of the present invention is to provide a rodless cylinder capable of preferably absorbing the load exerted on a slider, a displacement-transmitting member, or a piston in the horizontal and vertical directions, in the rotational direction about the axis, in the rotational direction about the perpendicular to the axis, and in various directions given by combining these directions in a complex manner.

A principal object of the present invention is to provide a rodless cylinder capable of improving the durability of a load-absorbing mechanism by making surface-to-surface contact to absorb the load exerted on a slider, a displacement-transmitting member, or a piston.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
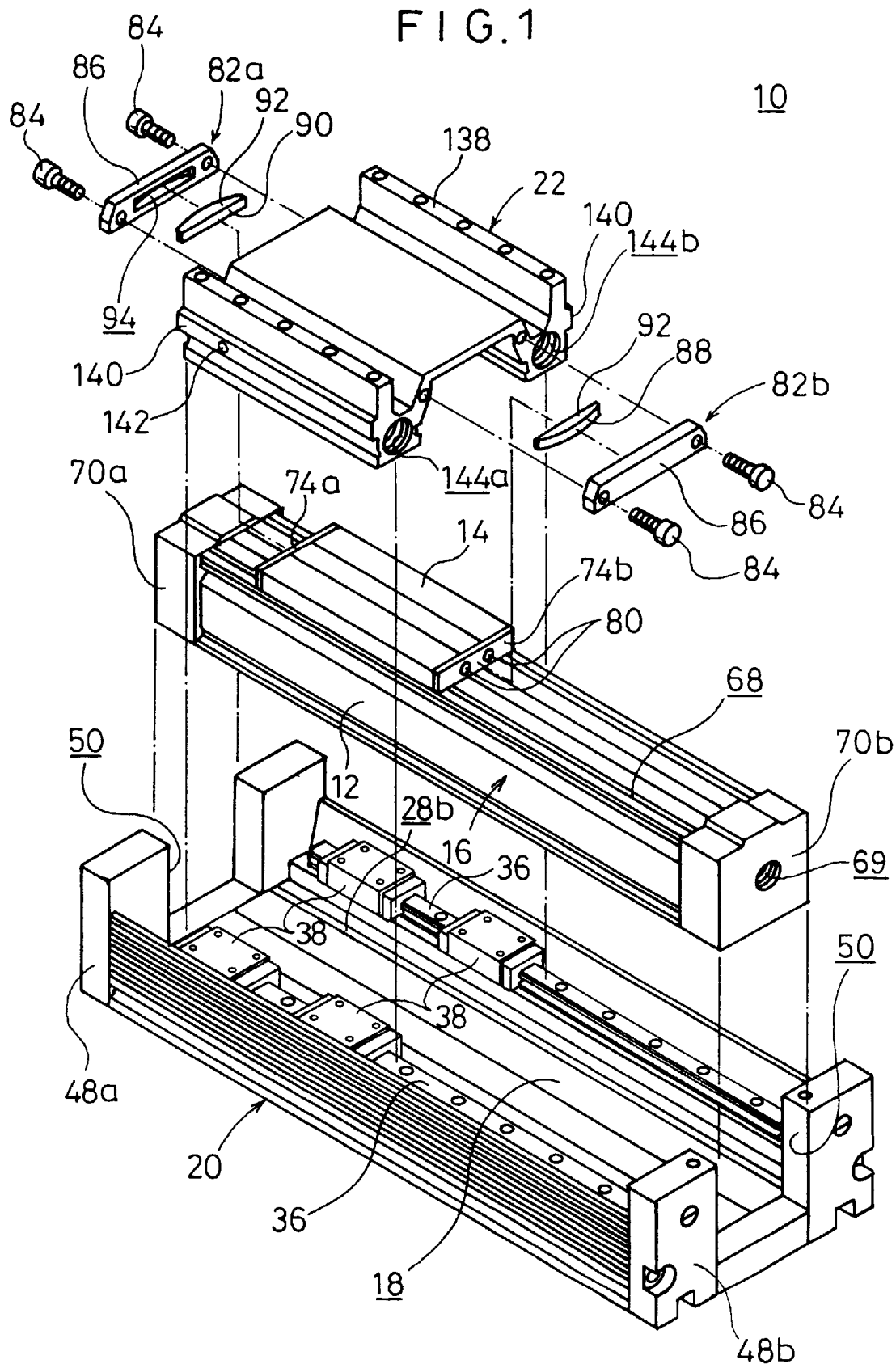
FIG. 1 schematically shows an exploded perspective view illustrating a rodless cylinder according to an embodiment of the present invention.

With reference to FIG. 1, reference numeral 10 indicates a rodless cylinder according to an embodiment of the present invention. The rodless cylinder 10 comprises a main cylinder body 16 provided with a movable member 14 which is disposed on an upper surface of a cylinder tube 12 and which is displaceable along the longitudinal direction of the cylinder tube 12, a guide frame 20 which is formed with a recess 18 for accommodating the main cylinder body 16, and a slider 22 which is displaceable integrally with the movable member 14 in the longitudinal direction of the guide frame 20.

Figure 3:
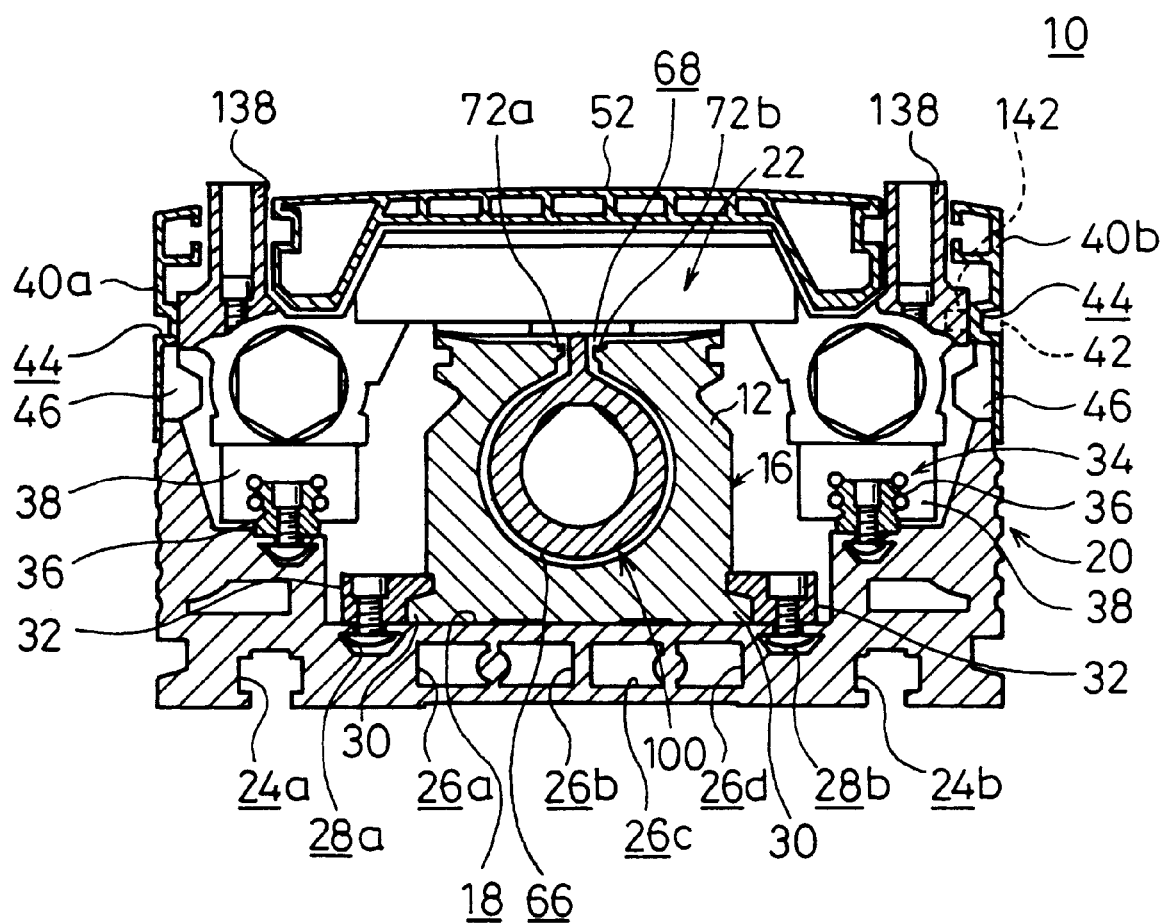
FIG. 3 shows a longitudinal sectional view taken along a line III—III shown in FIG. 2.

As shown in FIG. 3, two strips of extending attachment grooves 24a, 24b, which are used to attach the rodless cylinder 10 to another member by the aid of unillustrated attachment means such as bolts, are formed along the longitudinal direction on a lower surface of the guide frame 20. A plurality of passages 26a to 26d, which are utilized for centralized wiring or other purposes, are formed to extend along the longitudinal direction between the two strips of extending attachment grooves 24a, 24b.

The recess 18 for accommodating the main cylinder body 16, which has a width larger than the width of the cylinder tube 12, is formed on the guide frame 20. Two strips of extending fastening grooves 28a, 28b, which are substantially parallel to one another along the longitudinal direction, are formed on a bottom surface of the recess 18.

A fastening member 32, which engages with an engaging projection 30 formed at a lower end of the cylinder tube 12, is installed to each of the extending fastening grooves 28a, 28b. The cylinder tube 12 is fixed to the guide frame 20 by the aid of the fastening member 32.

The fastening member 32 is fastened at a desired position in the extending fastening groove 28a, 28b by means of a nut which engages with the extending fastening groove 28a, 28b and a screw member which is screwed into the nut. Linear guides 34, which are used to guide the slider 22 along the longitudinal direction of the guide frame 20, are provided on step sections adjacent to the extending fastening grooves 28a, 28b.

The linear guides 34 comprise guide rails 36 which extend in the longitudinal direction of the guide frame 20 and which are fixed by the aid of grooves formed on the step sections, and a pair of guide blocks 38 each of which has an inverted U-shaped configuration fixed to the lower surface of the slider 22 and which are slidable along the guide rails 36. The guide blocks 38 are secured to the lower surface of the slider 22. The guide rail 36 is fastened by nuts which engage with a groove and screw members which are screwed into the nut, in the same manner as the fastening member 32.

Figure 2:
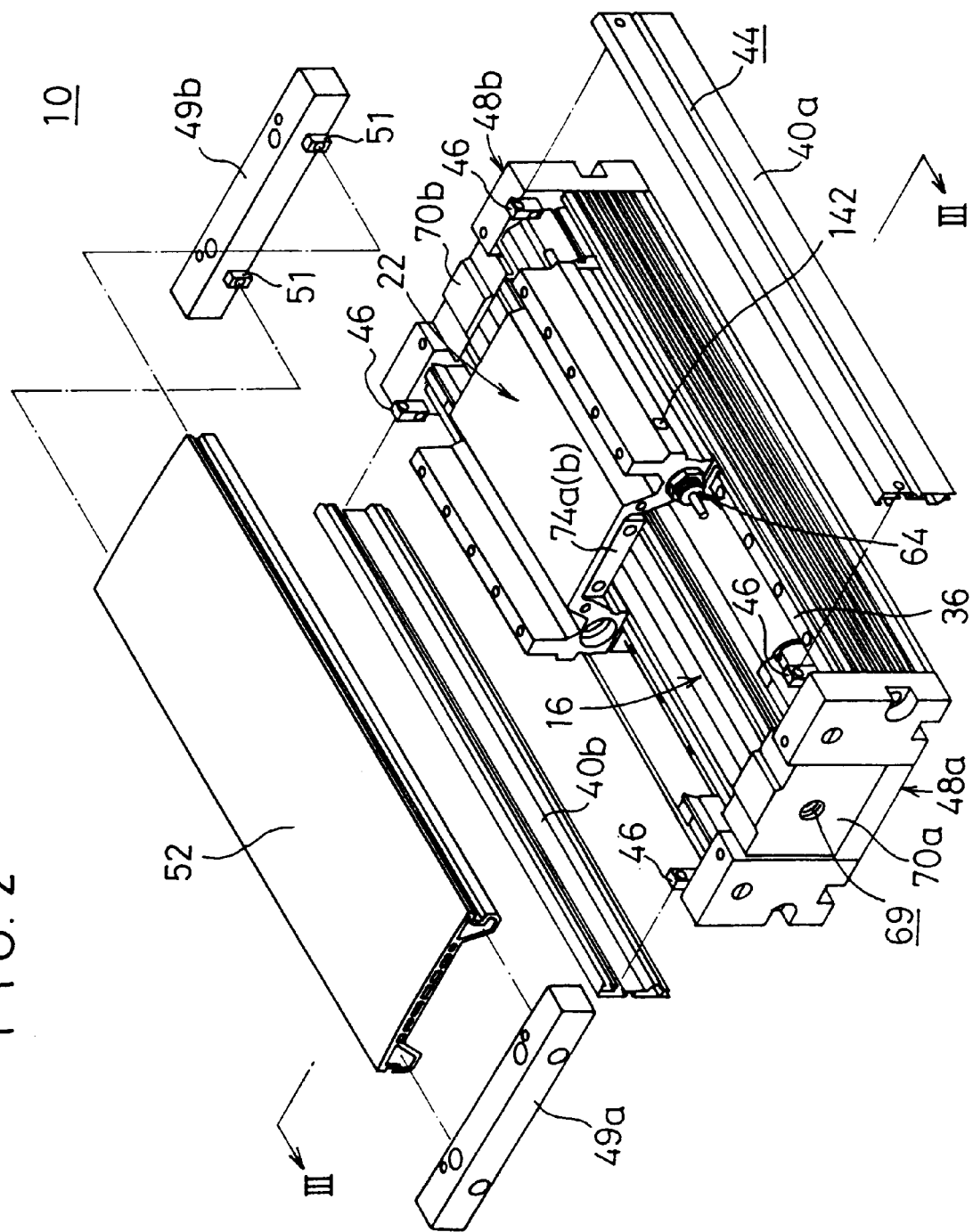
FIG. 2 shows an exploded perspective view illustrating a cover and an upper plate to be installed to the rodless cylinder shown in FIG. 1.

As shown in FIG. 2, side covers 40a, 40b, which extend along the longitudinal direction of the guide frame 20, are installed respectively to upper portions of mutually opposing side walls of the guide frame 20. A sensor attachment groove 44, which is used to attach a sensor 42 (see FIG. 3), is formed along the longitudinal direction on a side surface of the side cover 40a, 40b. The side covers 40a, 40b are detachably installed to the guide frame 20, and they are held by end plates 48a, 48b by the aid of holding members 46 respectively as described later on.

As shown in FIG. 1, the end plates 48a, 48b are connected to both ends of the guide frame 20 respectively along the longitudinal direction. A hole 50 having a rectangular cross section for accommodating the main cylinder body 16 is formed in the end plate 48a, 48b.

As shown in FIG. 2, a top cover 52, which extends along the longitudinal direction of the guide frame 20, is supported by projections 51 of a pair of upper plates 49a, 49b on upper surfaces of the end plates 48a, 48b.

Figure 4:
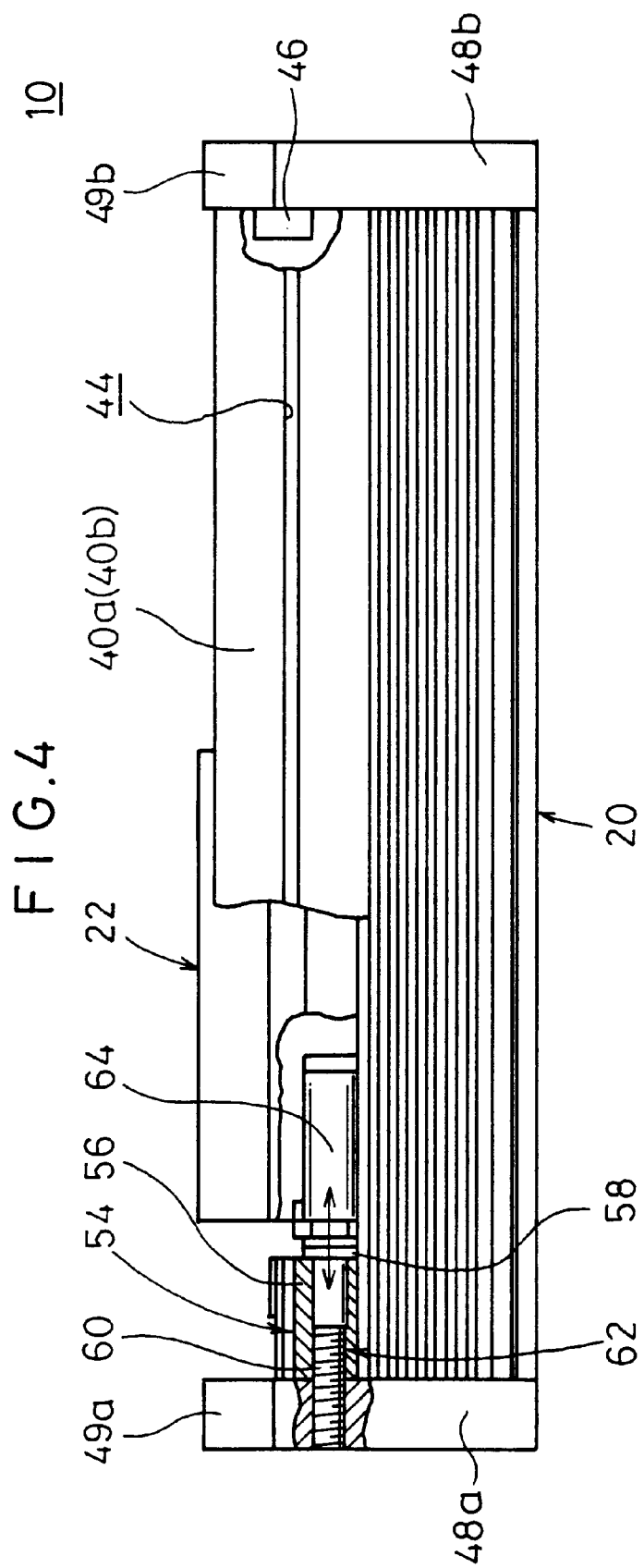
FIG. 4 shows a front view illustrating, with partial cutout, the rodless cylinder shown in FIG. 1.
Figure 5:
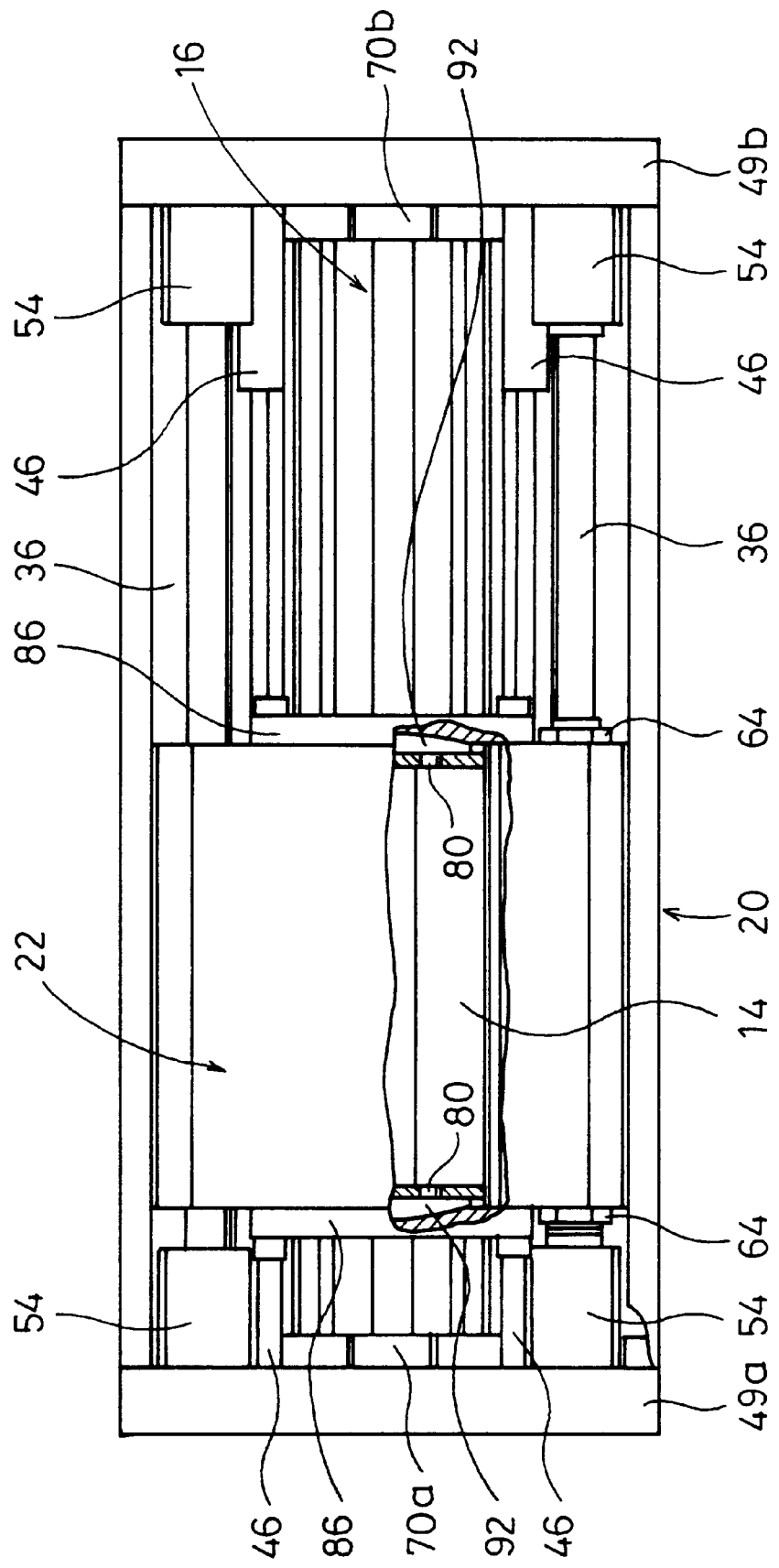
FIG. 5 shows a plan view illustrating, with partial cutout, the rodless cylinder shown in FIG. 4.
Figure 6:
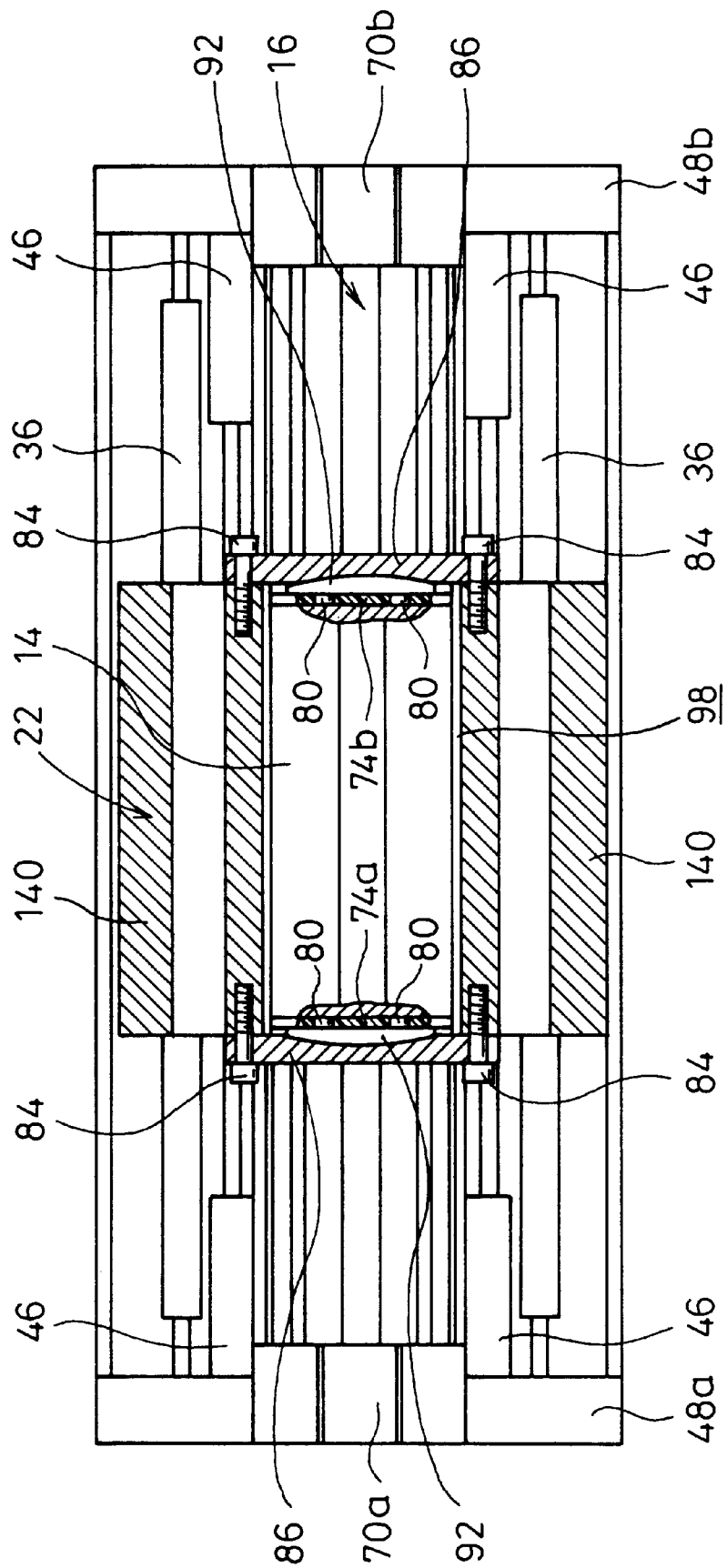
FIG. 6 shows a partial cross-sectional view illustrating the rodless cylinder shown in FIG. 4.

As shown in FIG. 4, a displacement amount-adjusting means 54 for adjusting the displacement amount of the slider 22 is provided on the end plate 48a (48b). The displacement amount-adjusting means 54 comprises a rectangular parallelepiped-shaped block member 56 which is secured to the side surface of the end plate 48a, 48b, and a bolt 62 which has a head 58 protruding from the block member 56 and which is formed with a screw section 60 to be screwed into a screw hole of the block member 56.

In this embodiment, for example, a screwdriver is engaged with a minus slot (not shown) formed on an opposite end of the head 58 of the bolt 62 to increase or decrease the screwing amount of the bolt 62. Thus, the bolt 62 can be displaced along the direction indicated by the arrow. As a result, the displacement amount of the slider 22 can be arbitrarily adjusted by varying the position for the head 58 of the bolt 62 to abut against a shock absorber 64 attached to the slider 22.

As shown in FIG. 3, the cylinder tube 12 of the main cylinder body 16 has, at its inside, a bore 66 which extends along the longitudinal direction. The bore 66 is in a state of communication with the outside through a slit 68 formed at an end surface of the cylinder tube 12. The cylinder tube 12 are closed in an air-tight manner at its both ends by rectangular parallelepiped-shaped end caps 70a, 70b (see FIG. 1) which are formed with pressurized fluid inlet/outlet ports 69 respectively. Step sections 72a, 72b, which are widened toward the bore 66, are formed on side walls which form the slit 68.

As shown in FIG. 1, the movable member 14 having a plate-shaped configuration, which is formed to have a width smaller than the width of the cylinder tube 12 in the transverse direction, is provided on the upper surface of the cylinder tube 12. Cover plates 74a, 74b made of resin are connected to both ends of the movable member 14 in the displacement direction. A pair of stepped holes 76 (see FIG. 7), which are spaced apart from each other by a predetermined distance, are formed through the cover plate 74a, 74b. A stopper 80, which has a cross-sectional configuration corresponding to the stepped hole 76 and which protrudes by a predetermined length toward a coupler described later on, is fitted and inserted into the stepped hole 76. The stopper 80 is formed of a material made of metal.

As shown in FIG. 1, a pair of load-absorbing mechanisms 82a, 82b are provided at both ends of the movable member 14 along the displacement direction. Each of the load-absorbing mechanisms 82a, 82b has the same construction, which is formed to be larger than the width of the movable member 14. The load-absorbing mechanism 82a, 82b comprises an end cover 86 which is fastened by screws to the end of the slider 22 by the aid of a pair of screw members 84, and a coupler 92 which has, on one side surface, a curved surface 88 formed to have an arc-shaped configuration with a predetermined radius of curvature and which has, on the other side surface, an even flat surface 90. Each of the end cover 86 and the coupler 92 is formed of, for example, a material made of metal such as an aluminum alloy.

A recess 94, which has a shape corresponding to the curved surface 88 of the coupler 92, is formed on one side surface of the end cover 86. The curved surface 88 of the coupler 92 and the recess 94 of the end cover 86 are relatively slidable in a state of surface-to-surface contact.

The coupler 92 is interposed between the cover plate 74a, 74b which forms the end of the movable member 14 and the end cover 86, 86. The flat surface 90 of the coupler 92 and the end surface of the stopper 80 protruding from the stepped hole 76 of the cover plate 74a, 74b are relatively slidable in a state of surface-to-surface contact.

In this embodiment, the stopper 80 is interposed in order to protect the cover plate 74a, 74b formed of the material made of resin. A clearance 96 is formed between the coupler 92 formed of the material made of metal and the cover plate 74a (74b) formed of the material made of resin (see FIG. 7). The cover plate 74a, 74b, which makes surface-to-surface contact with the flat surface 90 of the coupler 92, may be formed of a material made of metal without providing the stopper 80.

The curved surfaces 88 of the pair of couplers 92, which are provided at the both ends of the movable member 14 along the displacement direction, are mutually formed to have substantially the same circumferential configuration.

The movable member 14 is interposed by the pair of end covers 86 which are connected to the both ends of the slider 22 along the longitudinal direction. Thus, the movable member 14 and the slider 22 are displaceable in an integrated manner.

Figure 7:
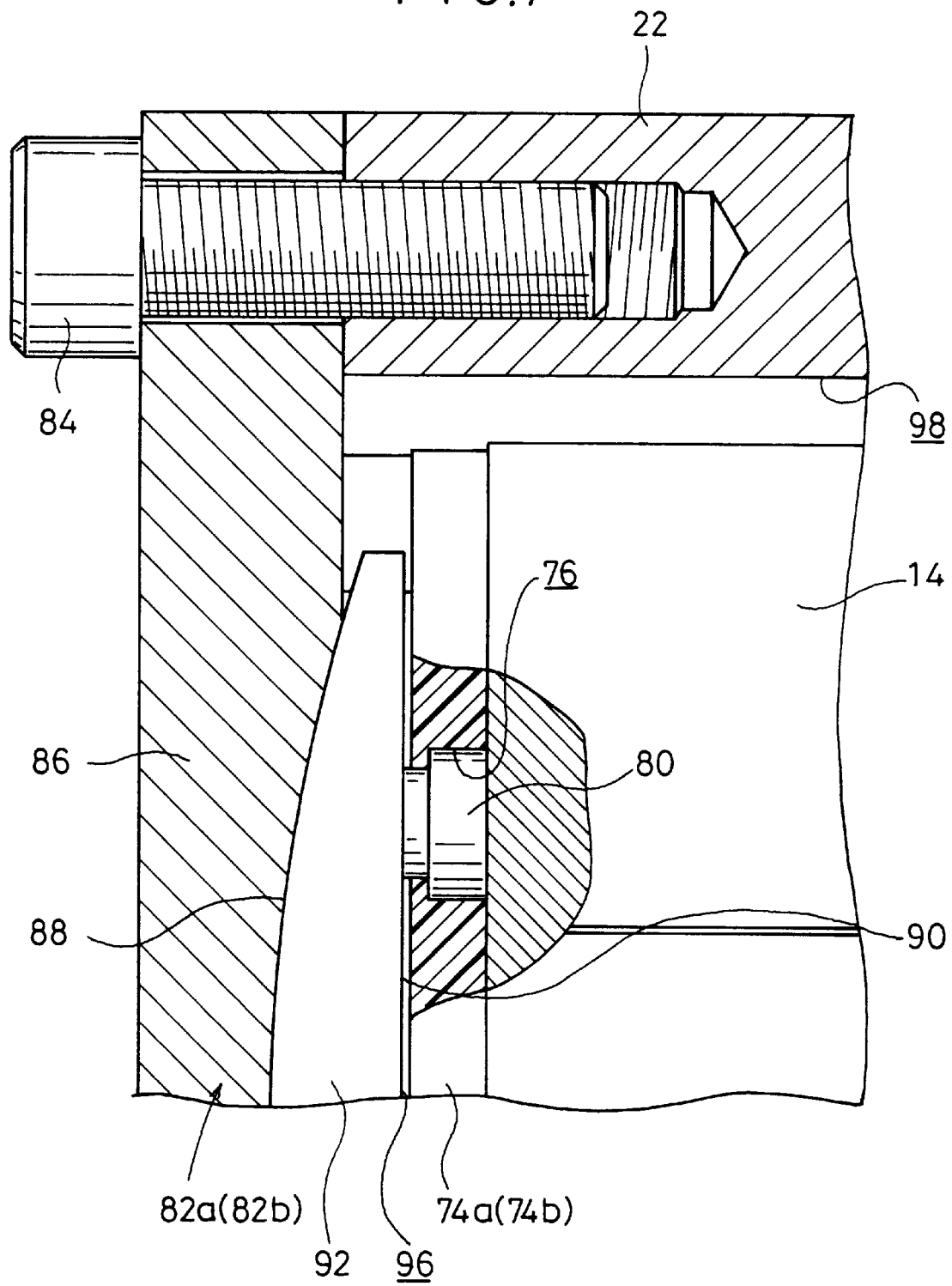
FIG. 7 shows a partial magnified sectional view illustrating a load-absorbing mechanism shown in FIG. 4.

In this embodiment, an appropriate clearance 98 is formed between the movable member 14 and inner and side wall surfaces of a ceiling of the slider 22 (see FIG. 7). The movable member 14 and the slider 22 are relatively slidable by the aid of the clearance 98 in the horizontal and vertical directions, in the rotational direction about the axis of the cylinder tube 12, and in the rotational direction about the perpendicular to the axis as described later on.

A groove (not shown) is formed, which penetrates through a central portion of the movable member 14 to extend in the longitudinal direction. The groove has its central portion which is widened in a circular configuration to form an unillustrated space. The groove is formed to be curved toward the upper surface of the movable member 14, and it functions as a floating mechanism which allows the displacement of the movable member 14. The floating mechanism is arbitrarily provided.

Figure 9:
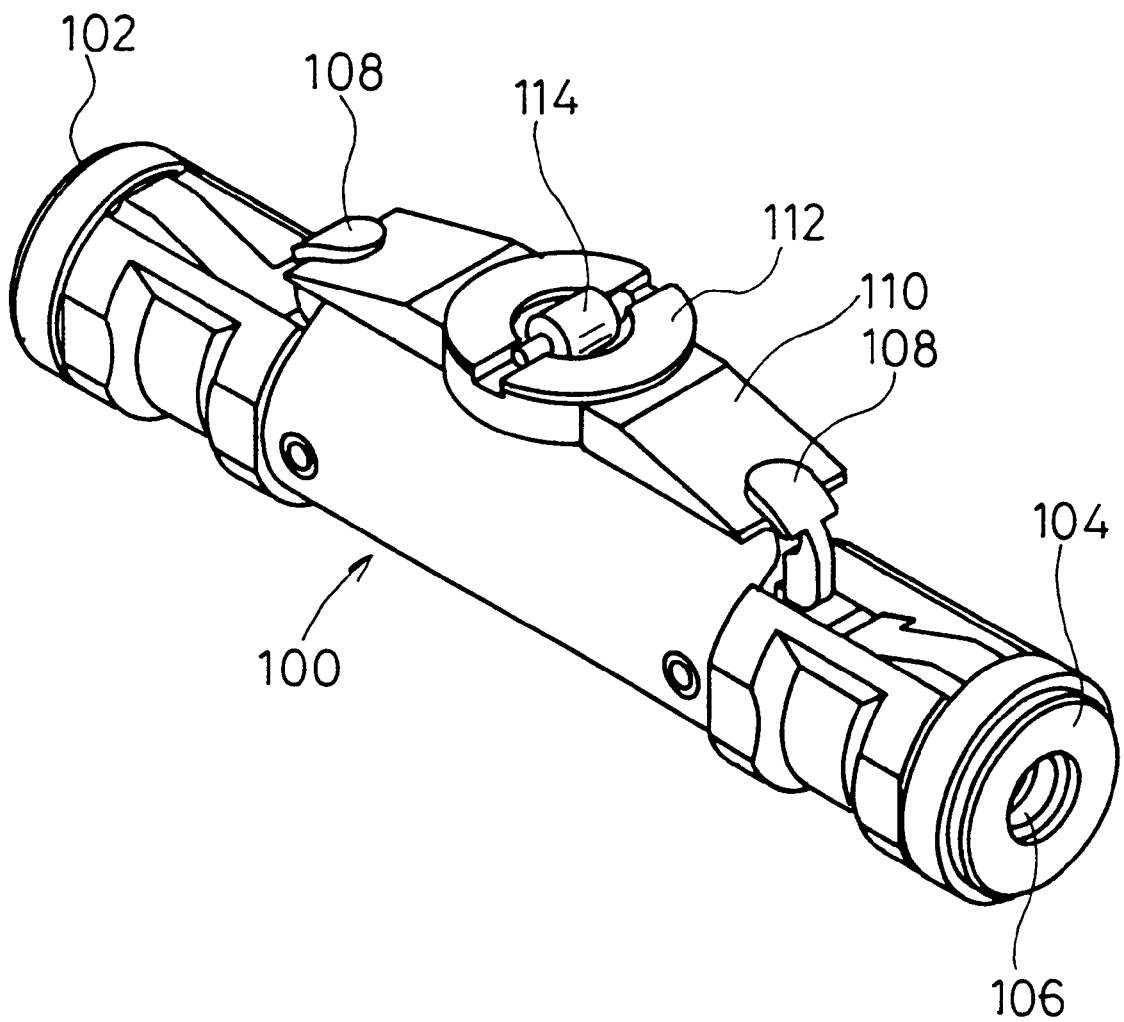
FIG. 9 shows a perspective view illustrating a piston arrange in a bore of a cylinder tube.

FIG. 9 shows a piston 100. The piston 100 has a first pressure-receiving surface 102 and a second pressure-receiving surface 104 disposed on the opposite side. A cushion seal 106 is provided at the inside thereof. The piston 100 having a cylindrical configuration comprises, at its upper portion, a belt separator 108 which is secured to a piston yoke 110. A roller 114 is rotatably supported by a shaft by the aid of a support member 112 provided over the piston yoke 110.

Figure 8:
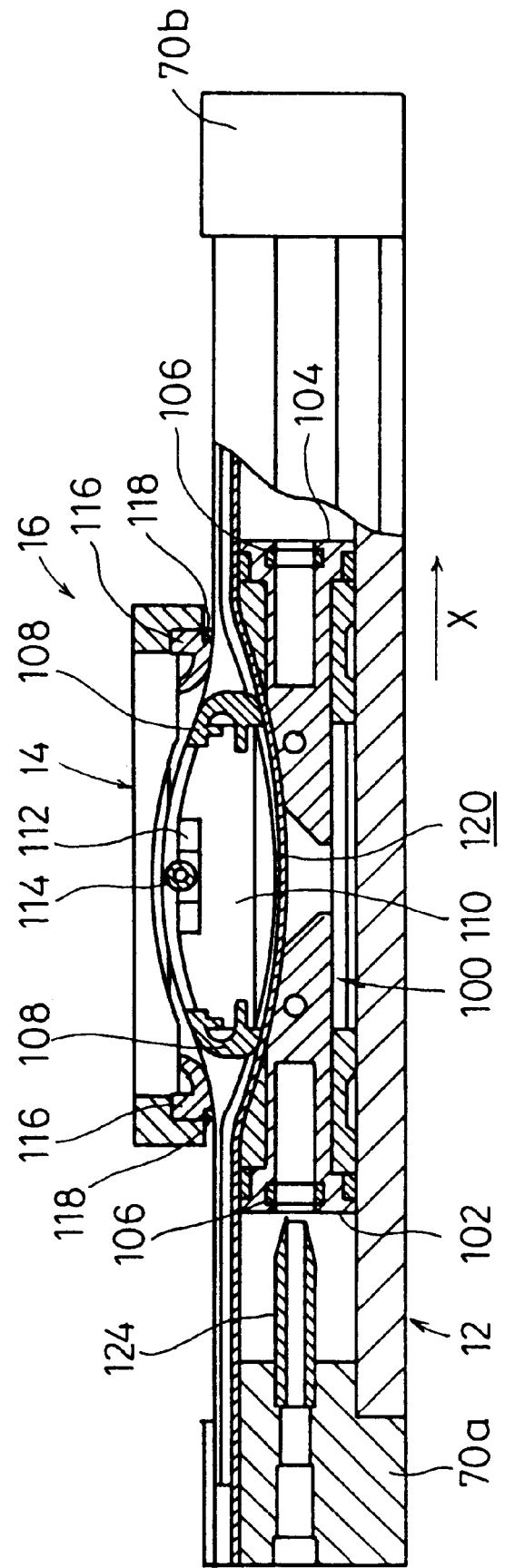
FIG. 8 shows a longitudinal side sectional view taken along the longitudinal direction of a main cylinder body.

As shown in FIG. 8, a backup plate 116 and a scraper 118 are provided at the inside of the movable member 14. The support member 112 described above is designed to be fitted to an unillustrated space having a circular planar configuration. In FIG. 8, reference numeral 120 indicates a passage for allowing a first seal member 122 described later on to enter the piston 122. Reference numeral 124 indicates a cylindrical cushion ring.

Figure 10:
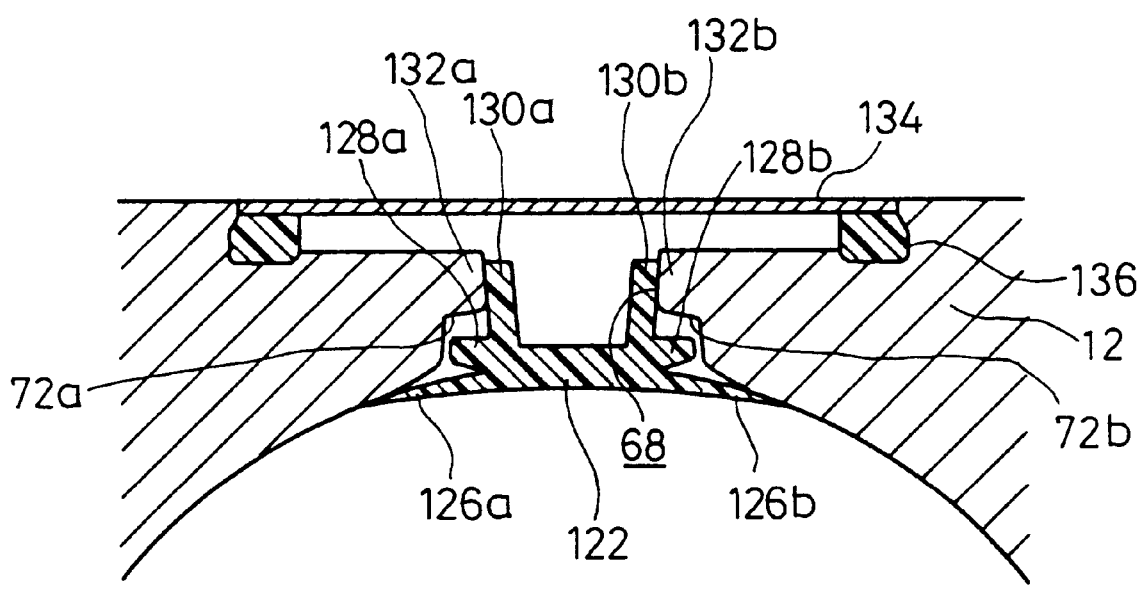
FIG. 10 shows a longitudinal sectional view illustrating, with partial omission, a state of engagement between a first seal member and a slit.
Figure 11:
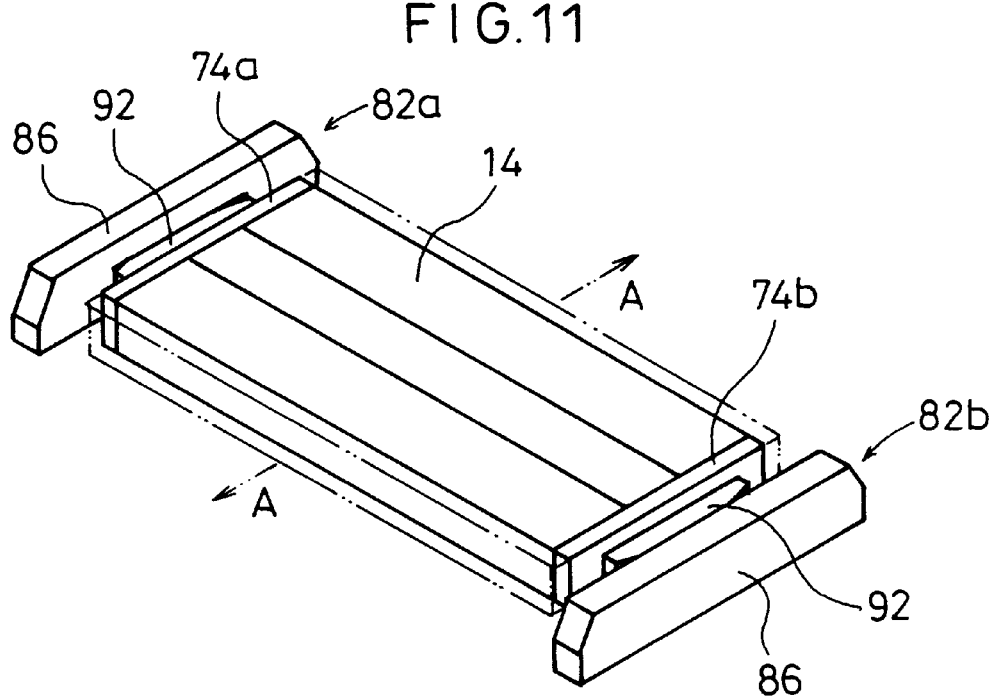
FIG. 11 illustrates the action to absorb the load exerted on a movable member in the horizontal direction.
Figure 12:
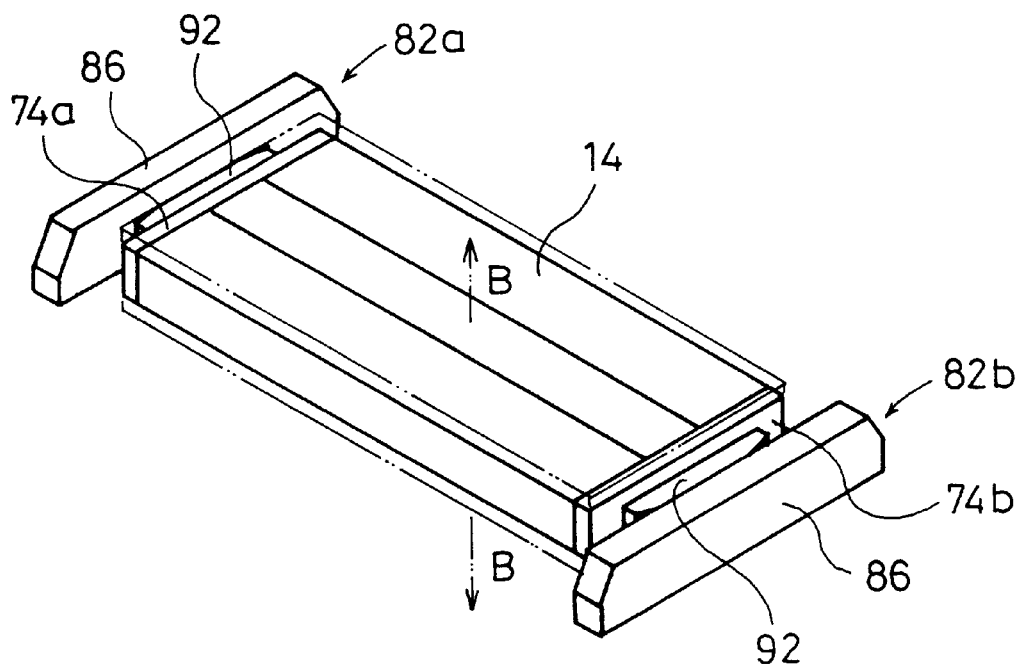
FIG. 12 illustrates the action to absorb the load exerted on the movable member in the vertical direction.
Figure 13:
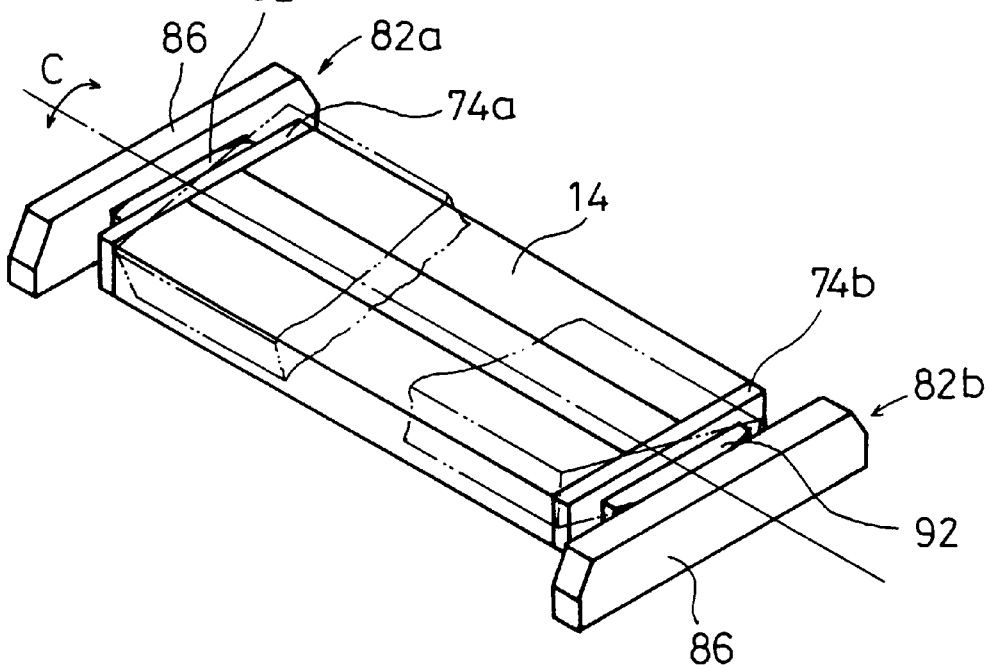
FIG. 13 illustrates the action to absorb the load exerted on the movable member in the rotational direction about the axis.
Figure 14:
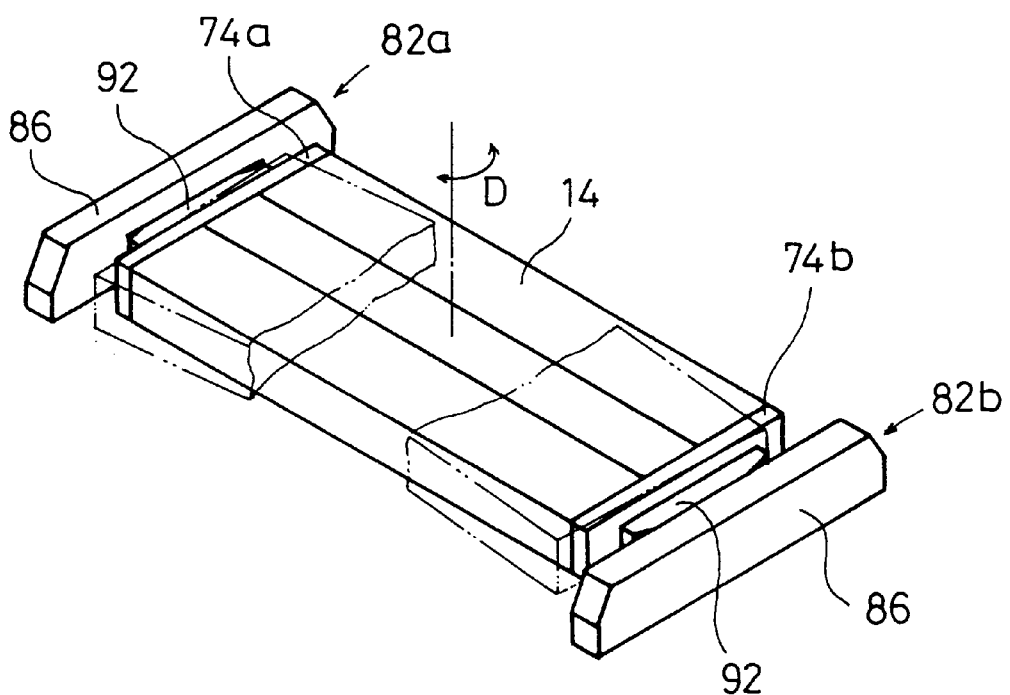
FIG. 14 illustrates the action to absorb the load exerted on the movable member in the rotational direction about the perpendicular to the axis.

FIG. 10 shows the seal member which is fitted to the step sections 72a, 72b formed at the slit 68 of the cylinder tube 12. The first seal member 122 has tongues 126a, 126b, and it further comprises expansions 128a, 128b disposed over the tongues 126a, 126b. Engaging tabs 130a, 130b extend from the expansions 128a, 128b so that they are slightly widened upwardly. The expansions 128a, 128b are provided to make engagement with the step sections 72a, 72b when the internal pressure is applied to the piston 100. Further, the engaging tabs 130a, 130b make engagement with inner surfaces 132a, 132b which form the slit 68. The first seal member 122 is integrally composed of a flexible synthetic resin material as a whole.

On the other hand, a second seal member 134 is provided to close the slit 68, and it is engaged with a groove 136 which extends in the longitudinal direction over the slit 68 formed at the upper end surface of the cylinder tube 12. The first seal member 122 enters the passage 120 of the piston 100. Both ends of the first seal member 122 are secured to the end caps 70a, 70b together with the second seal member 134.

As shown in FIG. 1, the slider 22 is provided at its both ends with attachment sections 138 which are formed to protrude upwardly and which extend along the displacement direction, and projecting strips 140 which are formed to protrude by a predetermined length from the side walls of the slider 22 along the horizontal direction and which extend in the displacement direction. A hole is formed at a predetermined portion of the projecting strip 140. A permanent magnet 142 having a substantially columnar configuration is fitted and inserted into the hole.

In this embodiment, the sensor 42 (see FIG. 3), which is installed at the predetermined portion of the sensor attachment groove 44 of the side cover 40a, 40b, detects the magnetic action of the permanent magnet 142 which makes displacement together with the slider 22. Thus, for example, it is possible to easily detect the displacement amount of the slider 22.

The slider 22 is formed, at its both ends, with a pair of holes 144a, 144b (see FIG. 1) which penetrate therethrough along the displacement direction. A shock absorber 64 (see FIG. 2), which effects a buffering action by making abutment against the head 58 of the bolt 62 described above, is fitted and inserted into the hole 144a, 144b.

The rodless cylinder 10 according to the embodiment of the present invention is basically constructed as described above. Next, its operation, function, and effect will be explained.

At first, as shown in FIG. 1, the main cylinder body 16 is inserted through the holes 50 having the rectangular cross-sectional configuration of the end plates 48a, 48b, into the space formed between the guide frame 20 and the slider 22. The fastening member 32 is engaged with the engaging projection 30 formed at the lower end of the main cylinder body 16. The fastening member 32 is fastened at the desired position of the extending fastening groove 28a, 28b formed at the bottom surface of the guide frame 20 by the aid of the screw member and the nut. Thus, the main cylinder body 16 is fixed in the recess 18 of the guide frame 20.

In this embodiment, it is sufficient that the main cylinder body 16 is fixed in the recess 18 of the guide frame 20 in a state of being positioned approximately. It is unnecessary to position the main cylinder body 16 highly accurately. In other words, the positional deviation between the cylinder tube 12 and the guide frame 20 is absorbed by the load-absorbing mechanisms 82a, 82b as described later on. Therefore, it is convenient to perform the operation to assemble the main cylinder body 16 in the recess 18 of the slider 22.

The main cylinder body 16 can be conveniently exchanged with another main cylinder body 16 of the same type or a different type by removing the fastening members 32 from the extending fastening grooves 28a, 28b. Accordingly, for example, the maintenance operation can be performed with ease. Even in a state in which an unillustrated workpiece is placed on the slider 22, the main cylinder body 16 can be exchanged conveniently and advantageously by drawing the main cylinder body 16 in the longitudinal direction through the holes 50 having the rectangular cross section of the end plates 48a, 48b.

The end covers 86 are installed to the slider 22 by the aid of the screw members 84 to interpose the movable member 14 with the pair of end covers 86. Thus, the movable member 14 is held by the slider 22.

After the rodless cylinder 10 is assembled as described above, the compressed air is introduced through one of the pressurized fluid inlet/outlet ports 69 formed through the end cap 70a. Thus, the compressed air passes through the passage formed at the inside of the cushion ring 124, and it presses the first pressure-receiving surface 102. The piston 100 is displaced rightward (in the direction of the arrow X) in FIG. 8 in accordance with the pressing action of the compressed air. At this time, the piston 100 is displaced integrally with the movable member 14, because the support member 112 is fitted to the unillustrated space of the movable member 14. The belt separator 108 functions to separate the first seal member 122 from the second seal member 134 between the movable member 14 and the piston 100 during the process of displacement of the movable member 14.

When the movable member 14 is displaced along the longitudinal direction of the cylinder tube 12, the slider 22 is displaced integrally together with the movable member 14 in accordance with the guiding action of the linear guides 34.

In the next step, when the compressed air is introduced into the other pressurized fluid inlet/outlet port 69 formed through the end cap 70b, the rodless cylinder 10 functions in a manner opposite to the above. It is noted that the roller 114 slidably contacts with the second seal member 134 to smoothly perform the displacement when the movable member 14 is displaced.

Explanation will now be made for the function to absorb the load when the load is applied to any one of the movable member 14 and the piston 100. In this embodiment, explanation will be made below with reference to FIGS. 11 to 14, as exemplified by the load exerted on the movable member 14.

When the load is exerted on the movable member 14 in the horizontal direction of the movable member 14, the movable member 14 makes displacement in the horizontal direction (direction of the arrow A) (see FIG. 11) by using, as the sliding surface, the contact surface between the flat surface 90 of the coupler 92 and the stopper 80 which make surface-to-surface contact with each other, by the aid of the clearance 98 between the movable member 14 and the slider 22. As a result, the load, which is exerted in the horizontal direction of the movable member 14, is absorbed.

When the load is exerted on the movable member 14 in the vertical direction of the movable member 14, the movable member 14 makes displacement in the vertical direction (direction of the arrow B) (see FIG. 12) by using, as the sliding surface, the contact surface between the flat surface 90 of the coupler 92 and the stopper 80 which make surface-to-surface contact with each other, by the aid of the clearance 98 between the movable member 14 and the slider 22. As a result, the load, which is exerted in the vertical direction of the movable member 14, is absorbed.

When the load is exerted on the movable member 14 in the rotational direction about the axis of the movable member 14, the movable member 14 makes rotational displacement about the axis of the movable member 14 (see the arrow C) (see FIG. 13) by using, as the sliding surface, the contact surface between the flat surface 90 of the coupler 92 and the stopper 80 which make surface-to-surface contact with each other, by the aid of the clearance 98 between the movable member 14 and the slider 22. As a result, the load, which is exerted in the rotational direction about the axis of the movable member 14, is absorbed.

When the load is exerted on the movable member 14 in the rotational direction about the perpendicular to the axis of the movable member 14, the movable member 14 makes rotational displacement about the perpendicular to the axis of the movable member 14 (see the arrow D) (see FIG. 14) by using, as the sliding surface, the contact surface between the curved surface 88 of the coupler 92 and the recess 94 of the end cover 86 which make surface-to-surface contact with each other, by the aid of the clearance 98 between the movable member 14 and the slider 22. As a result, the load, which is exerted in the rotational direction about the perpendicular to the axis of the movable member 14, is absorbed.

FIGS. 11 to 14 show the states in which the movable member 14 is displaced along the directions of the arrows A to D. However, there is no limitation thereto. The slider 22 can be also displaced in response to the exerted load by the aid of the coupler 92 and the end cover 86 in various directions including, for example, the horizontal direction, the vertical direction, the rotational direction about the axis of the movable member 14, the rotational direction about the perpendicular to the axis of the movable member 14, and directions given by combining these directions in a complex manner.

As described above, the load-absorbing mechanism 82*a*, 82*b* provided for the rodless cylinder 10 according to the embodiment of the present invention comprises the movable member 14 and the slider 22 which are relatively displaced in response to the load exerted in various directions including, for example, the horizontal direction, the vertical direction, the rotational direction about the axis of the movable member 14, the rotational direction about the perpendicular to the axis of the movable member 14, and directions given by combining these directions in a complex manner. Thus, the load is preferably absorbed.

Further, the load-absorbing mechanism 82*a*, 82*b* provided for the rodless cylinder 10 according to the embodiment of the present invention comprises the flat surface 90 of the coupler 92 and the end surface of the stopper 80 which make surface-to-surface contact with each other, and the curved surface 88 of the coupler 92 and the recess 94 of the end cover 86 which make surface-to-surface contact with each other. Therefore, for example, the coupler 92 and the end cover 86 are prevented from deformation, and it is possible to improve the durability of the load-absorbing mechanism 82*a*, 82*b*.

Furthermore, even when any positional deviation occurs between the cylinder tube 12 and the guide frame 20, for example, upon the assembly of the rodless cylinder 10, the positional deviation is preferably absorbed by the load-absorbing mechanism 82*a*, 82*b*. As a result, it is convenient to perform the operation to assemble the main cylinder body 16 in the recess 18 of the slider 22.

What is claimed is:

1. A rodless cylinder comprising:

a cylinder tube for allowing a piston to move reciprocatively along an internal space by the aid of a pressurized fluid supplied through a pressurized fluid inlet/outlet port;

a guide frame formed with a recess for accommodating said cylinder tube therein;

a slider for making displacement along a longitudinal direction in accordance with a guiding action of said guide frame;

a displacement-transmitting member connected to said piston, for transmitting displacement of said piston to said slider; and a load-absorbing mechanism provided for said displacement-transmitting member, for absorbing load exerted on said slider, said displacement-transmitting member, or said piston in horizontal and vertical directions, in a rotational direction about an axis of said cylinder tube, in a rotational direction about a perpendicular to said axis, and in various directions given by combining these directions in a complex manner.

2. The rodless cylinder according to claim 1, wherein said displacement-transmitting member comprises a movable member connected to said piston for making displacement along an outer surface of said cylinder tube.

3. The rodless cylinder according to claim 2, wherein said load-absorbing mechanisms are provided at one end and the other end of said movable member along its displacement direction respectively.

4. The rodless cylinder according to claim 3, wherein said load-absorbing mechanism comprises a coupler which has a flat surface formed on one side surface and a curved surface formed on the other side surface, and an end cover which is formed with a recess having a shape corresponding to said curved surface of said coupler, and wherein said end cover is connected to said slider so that an end surface of said movable member and said flat surface of said coupler slidably make surface-to-surface contact with each other, while said curved surface of said coupler and said recess of said end cover slidably make surface-to-surface contact with each other.

5. The rodless cylinder according to claim 1, wherein said cylinder tube is installed exchangeably to said guide frame by accommodating said cylinder tube in said recess of said guide frame.

6. The rodless cylinder according to claim 5, wherein an end plate is connected to an end of said guide frame, and a hole, through which said cylinder tube is drawable along said longitudinal direction, is formed in said end plate.

7. The rodless cylinder according to claim 1, wherein at least a pair of side covers are detachably installed to upper portions of mutually opposing side walls of said guide frame.

8. The rodless cylinder according to claim 7, wherein a sensor attachment groove for attaching a sensor is formed along said longitudinal direction on a side surface of said side cover.

9. The rodless cylinder according to claim 8, wherein a permanent magnet is arranged in a hole formed at a predetermined portion of a projecting strip protruding from a side wall of said slider toward said side cover, and said sensor detects a magnetic action of said permanent magnet.

10. The rodless cylinder according to claim 4, wherein said curved surfaces of said couplers, which are provided one end and the other end of said movable member along a displacement direction respectively, are mutually formed to have substantially the same circumferential configuration.

11. The rodless cylinder according to claim 4, wherein said load, which is exerted on said slider, said movable member, or the piston in said horizontal and vertical directions and in said rotational direction about said axis of said cylinder tube, is absorbed by mutual sliding movement in a state of said surface-to-surface contact of said end surface of said movable member and said flat surface of said coupler by the aid of a clearance formed between said slider and said movable member, and said load, which is exerted in said rotational direction about said perpendicular to said axis of said cylinder tube, is absorbed by mutual sliding movement in a state of said surface-to-surface contact of said curved surface of said coupler and said recess of said end cover by the aid of said clearance formed between said slider and said movable member.

12. The rodless cylinder according to claim 1, wherein said load-absorbing mechanism functions to absorb positional deviation between said guide frame and said cylinder tube accommodated in said recess of said guide frame upon assembly.

* * * * *